US007861215B2

(12) United States Patent
Tong et al.

(10) Patent No.: US 7,861,215 B2
(45) Date of Patent: Dec. 28, 2010

(54) METHOD, SYSTEM, AND PROGRAM PRODUCT FOR MODELING PROCESSES

(75) Inventors: Tack Tong, Scarborough (CA); Jay W. Benayon, Thornhill (CA); Lev Mirlas, Thornhill (CA); Anne Marie Lafond, Scarborough (CA); Humie Leung, North York (CA); Randolph P. Williams, Markham (CA)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 11/421,160

(22) Filed: May 31, 2006

(65) Prior Publication Data

US 2007/0283318 A1    Dec. 6, 2007

(51) Int. Cl.
G06F 9/44 (2006.01)

(52) U.S. Cl. .................... 717/104; 717/101; 717/102; 715/230; 715/233

(58) Field of Classification Search ............. 717/101, 717/102, 104; 715/763, 230, 233; 718/106; 705/7
See application file for complete search history.

(56) References Cited

U.S. PATENT DOCUMENTS

| | | | | |
|---|---|---|---|---|
| 5,596,751 A * | 1/1997 | Glas et al. ................ | 718/106 |
| 5,829,239 A | 11/1998 | Iwama et al. | |
| 5,893,055 A * | 4/1999 | Chen ........................ | 702/189 |
| 5,930,512 A * | 7/1999 | Boden et al. ............. | 717/102 |
| 6,018,627 A * | 1/2000 | Iyengar et al. ............ | 717/103 |
| 6,038,393 A * | 3/2000 | Iyengar et al. ............ | 717/104 |
| 6,167,564 A * | 12/2000 | Fontana et al. ........... | 717/104 |
| 6,233,495 B1 * | 5/2001 | Chen ........................ | 700/122 |
| 6,237,020 B1 * | 5/2001 | Leymann et al. ......... | 709/201 |
| 6,339,838 B1 * | 1/2002 | Weinman, Jr. ............ | 717/104 |
| 6,405,173 B1 * | 6/2002 | Honarvar et al. ......... | 705/7 |
| 6,421,613 B1 * | 7/2002 | Nadimpalli et al. ...... | 702/20 |
| 6,601,234 B1 * | 7/2003 | Bowman-Amuah ...... | 717/108 |
| 7,043,415 B1 * | 5/2006 | Dunlavey et al. ........ | 703/12 |
| 7,134,090 B2 * | 11/2006 | Kodosky et al. ......... | 715/769 |
| 7,272,815 B1 * | 9/2007 | Eldridge et al. .......... | 717/101 |
| 7,356,774 B2 * | 4/2008 | Shah et al. ................ | 715/771 |
| 7,478,337 B2 * | 1/2009 | Kodosky et al. ......... | 715/771 |
| 7,559,032 B2 * | 7/2009 | King et al. ............... | 715/763 |
| 7,627,860 B2 * | 12/2009 | Kodosky et al. ......... | 717/141 |
| 7,761,802 B2 * | 7/2010 | Shah et al. ................ | 715/771 |
| 2002/0055849 A1 | 5/2002 | Georgakopoulos et al. | |

(Continued)

OTHER PUBLICATIONS

Title: Parse-tree annotations meet re-engineering concerns, author:Kort, J.; Lammel, R, dated: Oct. 20, 2003; source: IEEE.*

(Continued)

*Primary Examiner*—Chameli C Das
(74) *Attorney, Agent, or Firm*—Marcia L. Doubet (57) ABSTRACT

The present invention provides a method, system, and program product for modeling processes such as business processes. Specifically, under the present invention, a process having multiple variations is modeled as a placeholder process, and is associated with an annotation that maps the multiple variations to different contexts of the placeholder process. Thereafter, process variations can be generated based on the different contexts of the placeholder process. Integrity checks can also be performed to determine if any of the process variations has an error so that the generation of any corresponding process will be prevented.

16 Claims, 10 Drawing Sheets

U.S. PATENT DOCUMENTS

| | | |
|---|---|---|
| 2002/0128890 A1 | 9/2002 | Dick et al. |
| 2003/0035006 A1* | 2/2003 | Kodosky et al. ............ 345/763 |
| 2004/0162741 A1 | 8/2004 | Flaxer et al. |
| 2005/0038764 A1 | 2/2005 | Minsky et al. |
| 2005/0125771 A1 | 6/2005 | Vitanov et al. |

OTHER PUBLICATIONS

Title: Rescaling State and Input Variables for the Purpose of Analyzing Process Models, author:Bonvin, Dominique el al, source: IEEE, dated: Jun. 2, 1985.*

OCL-Constraints for UMM Collaborations, Sep. 9, 2004, 13 pgs., Final Version, Birgit Hofreiter, et al.

* cited by examiner

METHOD, SYSTEM, AND PROGRAM PRODUCT FOR MODELING PROCESSES

BACKGROUND OF THE INVENTION

1. Field of the Invention

In general, the present invention relates to process modeling. Specifically, the present invention provides a way to model a process such as a business process that has multiple variations.

2. Related Art (Business) process modeling is used by organizations to specify how their businesses are being run (e.g., how tasks flow from one to another, who is doing which tasks, what is the business data flow between tasks, etc.). In many instances, processes can be represented and interrelated with one another in a hierarchical tree-like structure whereby a process (root node) can have one or more sub-processes (child nodes), which themselves could each have one or more sub-processes (grandchild nodes), etc.

Process modeling is also used by application solution vendors to describe the business processes they support as a means to better communicate with business users. Performing business process modeling for a large application solution that encompasses multiple domain contexts (e.g. WebSphere® Commerce offered by International Business Machines Corporation) presents a unique challenge. In many instances, the business processes in each of the multiple domain contexts are very similar with the exception of some variations in sub-processes at the "leaves" of the process tree.

Figure 1:
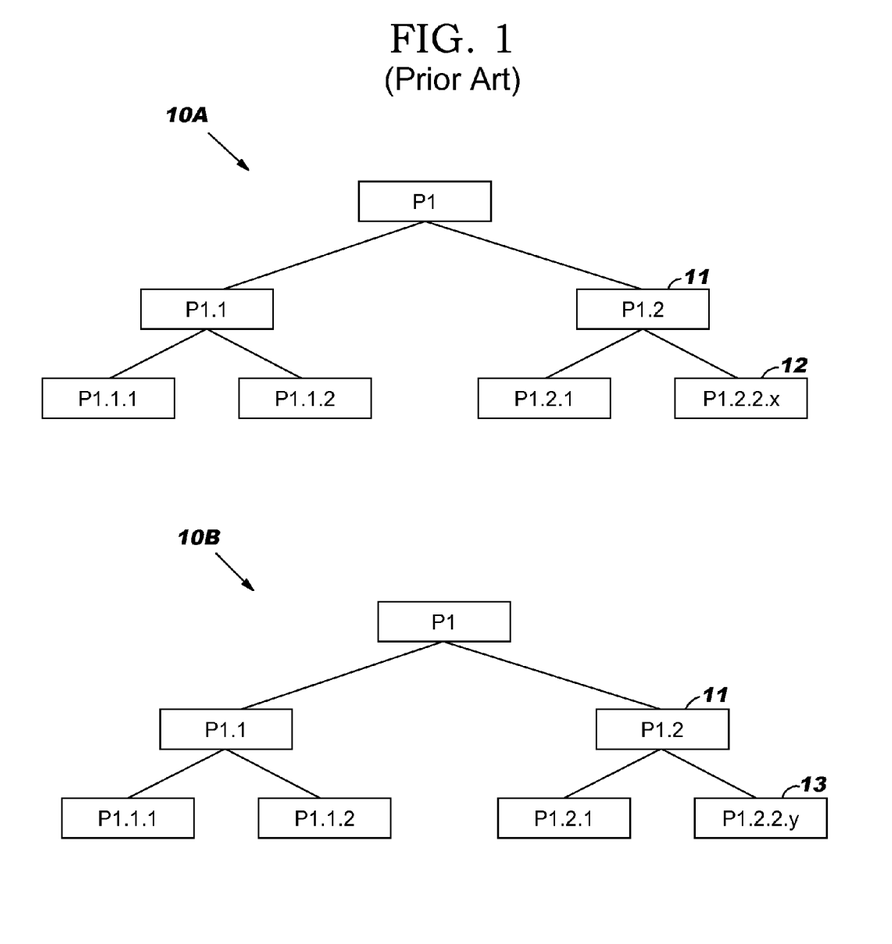
FIG. 1 depicts a first process tree according to the prior art.

FIG. 1 depicts a process tree 10A for a first specific context (e.g., business to consumer (B2C)) and a process tree 10B for a second specific context (e.g., business to business (B2B)). It can be seen that the two trees appear identical except for processes P1.2.2.$x$ (see reference number 12) and P1.2.2.$y$ (see reference number 13) on the lower right corner of trees 10A-B. These are two variations of the same process P1.2.2, one for B2C and one for B2B. Such differences make modeling process trees 10A-B a problem. Specifically, process P1.2 (see reference number 11) cannot be modeled to use both P1.2.2.$x$ and P1.2.2.$y$. Rather, it can only be modeled to use one of them and two versions of P1.2 will result. One version (P1.2.$x$) will result for the B2C context to use P1.2.2.$x$ (reference number 12) and another version (P1.2.$y$) will result for the B2B context to utilize P1.2.2.$y$ (reference number 13).

Figure 2:
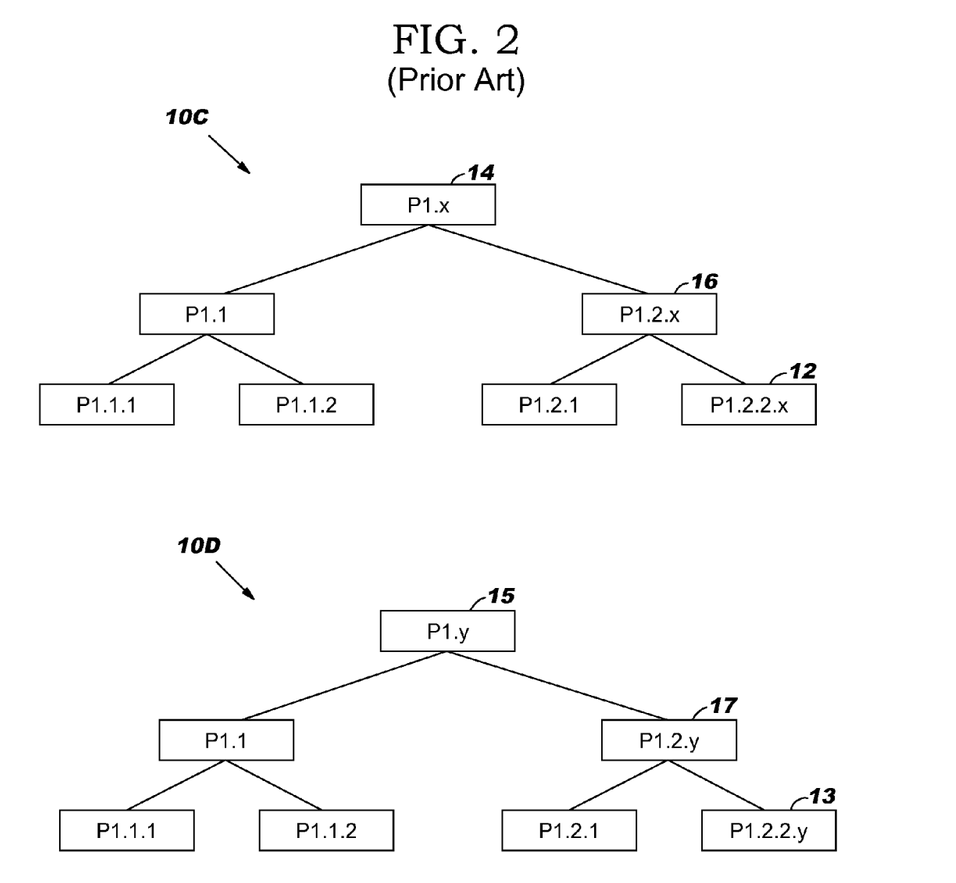
FIG. 2 depicts a second process tree according to the prior art
Figure 3:
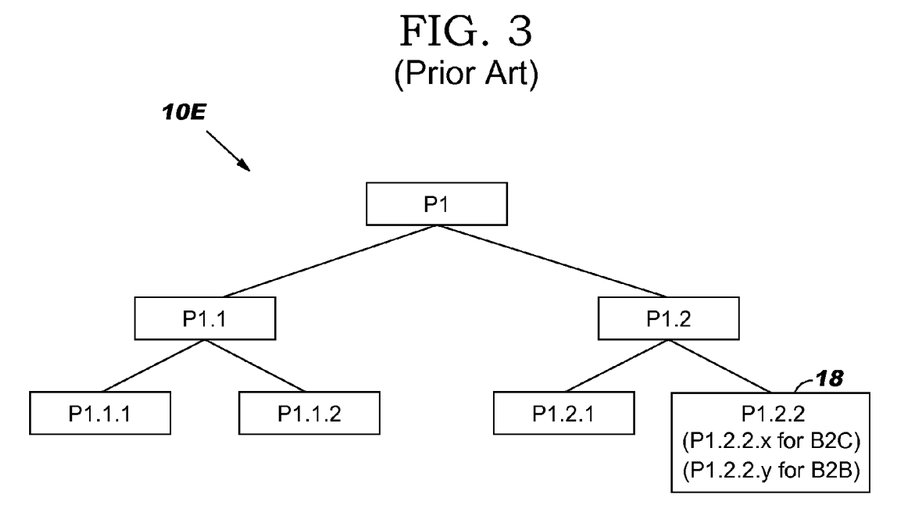
FIG. 3 depicts a third process tree according to the prior art.

Once this starts to occur, the phenomenon will propagate up process trees 10A-B and can soon result in process trees 10C-D as shown in FIG. 2. Since P1.$x$ (see reference number 14) and P1.$y$ (see reference number 15) —and similarly for P1.2$x$ (see reference number 16) and P1.2$y$ (see reference number 17)—are essentially the same process, having two variations of it creates management and maintenance problems. This is especially the case for process trees having a multitude of processes and many levels of depth, which means that the problem described here would be amplified and become unmanageable. Another dimension is the number of contexts supported, which could significantly increase the complexity of the problem. One current approach is to have both P1.2.2.$x$ (reference number 12) and P1.2.2.$y$ (reference number 13) defined in a single process P1.2.2 (see reference number 18), as shown in process tree 10E of FIG. 3. Unfortunately, this approach does not work well for tools that perform integrity checking during the modeling. Also, this approach would invalidate the potential of running process simulation or generating to process flow runtime (e.g. BPEL). Still yet, this approach would complicate generation with respect to UML artifacts for implementation.

In view of the foregoing, there exists a need for a solution that solves at least one of the above-mentioned problems.

SUMMARY OF THE INVENTION

In general, the present invention provides a method, system, and program product for modeling processes such as business processes. Specifically, under the present invention, a process having multiple variations is modeled as a placeholder process, and is associated with an annotation that maps the multiple variations to different contexts of the placeholder process. Thereafter, process variations can be generated based on the different contexts of the placeholder process. Integrity checks can also be performed to determine if any of the process variations has an error so that the generation of any corresponding process will be prevented.

A first aspect of the present invention provides a method for modeling processes, comprising: modeling a process having multiple variations as a placeholder process; and associating an annotation with the placeholder process that maps the multiple variations to different contexts of the placeholder process.

A second aspect of the present invention provides a system for modeling processes, comprising: a system for modeling a process having multiple variations as a placeholder process; and a system for associating an annotation with the placeholder process that maps the multiple variations to different contexts of the placeholder process.

A third aspect of the present invention provides a program product stored on a computer readable medium for modeling processes, the program product comprising program code for causing a computer system to perform: modeling a process having multiple variations as a placeholder process; and associating an annotation with the placeholder process that maps the multiple variations to different contexts of the placeholder process.

A fourth aspect of the present invention provides a method for deploying an application for modeling processes, comprising: providing a computer infrastructure being operable to: model a process having multiple variations as a placeholder process; and associate an annotation with the placeholder process that maps the multiple variations to different contexts of the placeholder process.

A fifth aspect of the present invention provides computer software embodied in a propagated signal stored on a computer readable medium for modeling processes, the computer software comprising program code for causing a computer system to perform the following steps: modeling a process having multiple variations as a placeholder process; and associating an annotation with the placeholder process that maps the multiple variations to different contexts of the placeholder process.

Therefore, the present invention provides a method, system, and program product for modeling process variations.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. General Description
II. Computerized Implementation

I. General Description

The present invention provides a method, system, and program product for modeling processes such as business processes. Specifically, under the present invention, a process having multiple variations is modeled as a placeholder process, and is associated with an annotation that maps the multiple variations to different contexts of the placeholder process. Thereafter, process variations can be generated based on the different contexts of the placeholder process. Integrity checks can also be performed to determine if any of the process variations has an error so that the generation of any corresponding process will be prevented.

Figure 4:
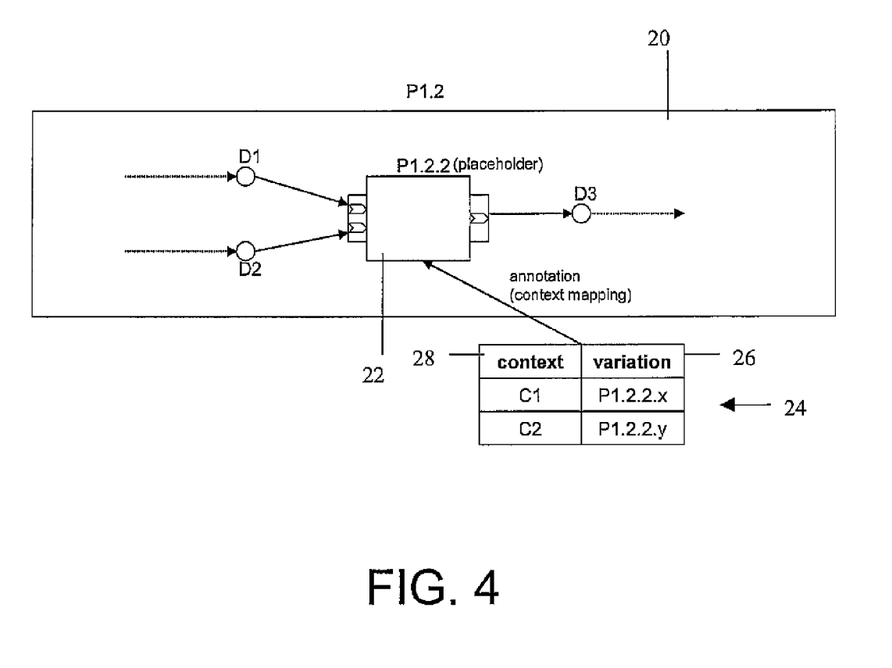
FIG. 4 depicts a placeholder scheme for modeling a process according to the present invention.

Referring now to FIG. 4, a placeholder scheme 20 for modeling a process according to the present invention is shown. Specifically, as indicated above, a process can have multiple variations 26. In this example, a first variation of the process is P1.2.2.x and a second variation of the process is P1.2.2.y. Under the present invention, these multiple variations are addressed by modeling the multi-variant process as a placeholder process 22. To this extent, a placeholder will replace the variant value of the original process (e.g., the x and y in this example). Thereafter, an annotation 24 that maps the multiple variations 26 to different contexts 28 of placeholder process 22 will be associated with placeholder process 22. As shown, context C1 is mapped to variation P1.2.2.x and content C2 is mapped to variation P1.2.2.y. As further shown in FIG. 4, placeholder process 22 receives input data sets D1 and D2 and sends output data set D3.

Figure 5:
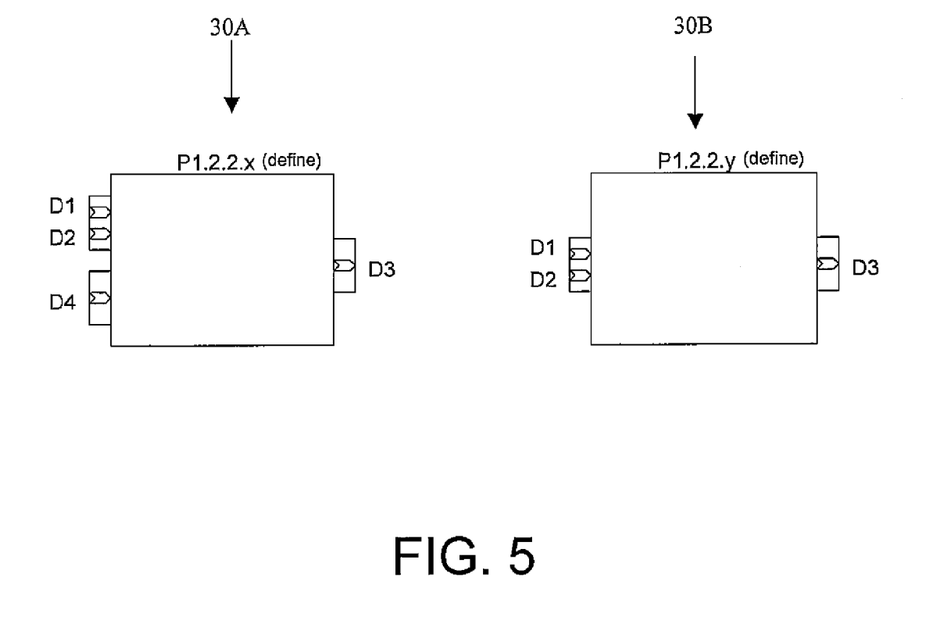
FIG. 5 depicts two process variations according to the present invention.

As will be further described below, the variations of a process are typically differentiated by the data sets they input and/or export. That is, one variation of the process might receive input data set D1, while the other variation might receive input data set D2. To this extent, placeholder process 22 is similar to a normal process from the outside in that it has defined inputs and outputs. However, placeholder process 22 does not have an implementation (e.g., what is inside P1.2.2 is not formally defined). As such, the actual process for P1.2.2 is defined by its variations. This is further illustrated in FIG. 5, which shows examples of two process variations 30A-B. As shown, variation 30A receives input data sets D1, D2, and D4, while variation 30B receives input data sets D1 and D2. In this example, D4 denotes an OR condition in that variation 30A takes either D1 and D2, or D4 as input. It should be noted that the input and output data sets of both process variations 30A-B as well as placeholder process 22 (FIG. 4) do not have to be matched exactly. The key is that the usage of process variations 30A-B in placeholder process 22 is valid. Integrity checking will be done to ensure the data type and logic criteria of both inputs and outputs are valid for usage of process variations 30A-B in place of placeholder process 22.

Figure 6:
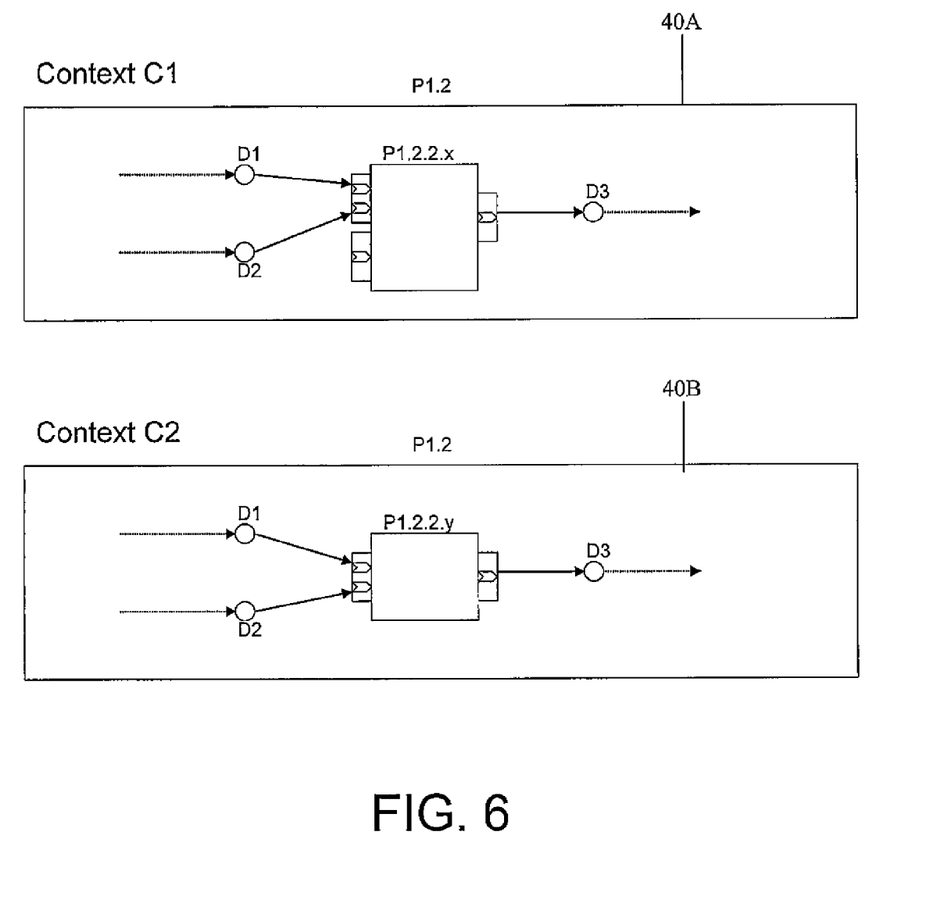
FIG. 6 depicts the generation of a process according to the present invention.

Another feature of the present invention is generation of a process for a context. This is illustrated in FIG. 6. Specifically, FIG. 6 shows the generation of processes 40A-B corresponding to contexts C1 and C2 (FIG. 4), respectively. In an illustrative embodiment of the present invention, processes 40A-B are business processes that are variations of one another. One variation can represent a B2B business process, while the other variation can represent a B2C business process. Because the mappings were associated with the placeholder process in FIG. 4, the variations are mapped to specific contexts, namely, C1 and C2.

Figure 7:
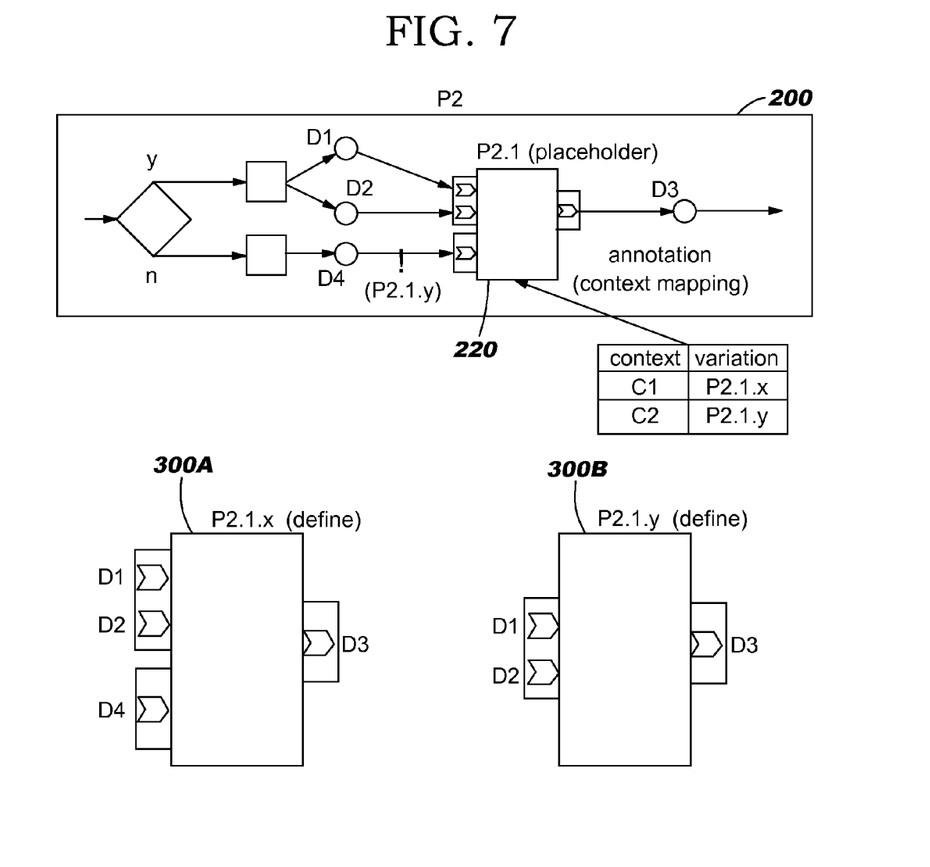
FIG. 7 depicts an integrity check process according to the represent invention.
Figure 8:
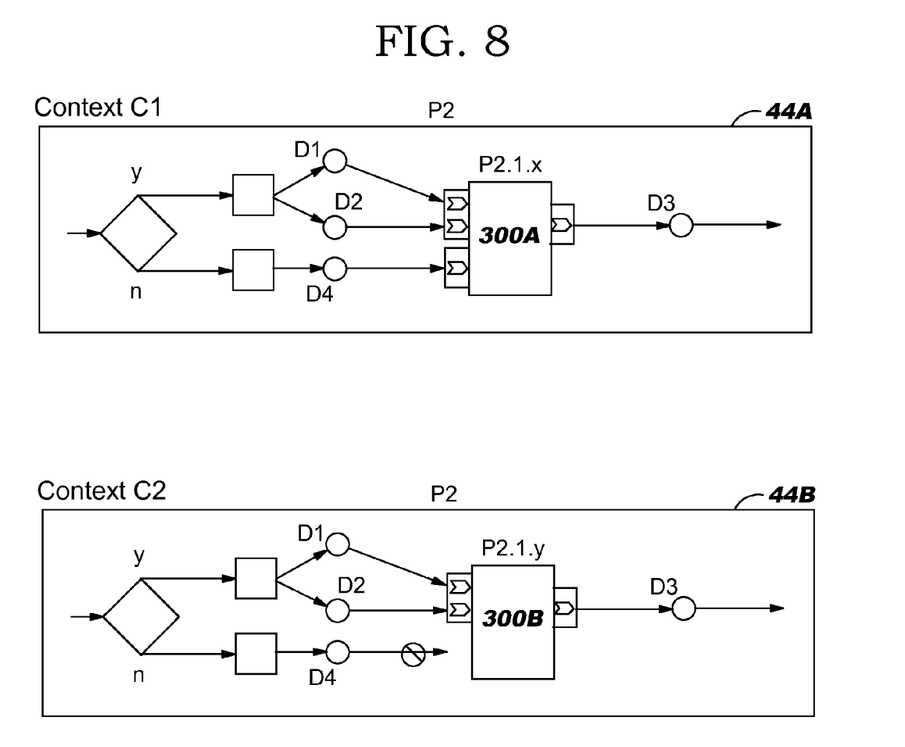
FIG. 8 depicts the generation of a process in response to an integrity check according to the present invention.

Referring to FIG. 7, a slightly different example is shown that illustrates the integrity check and exception/error functions of the present invention. Specifically, the invention performs an integrity check on placeholder scheme 200 to determine if any of the process variations 300A, 300B has an exception/error. In the example shown in FIG. 7, an error has been detected relative to variation 300B, context C2 based on input data stream D4. Specifically, the integrity check determined that there would be an error if process variation P2.1.y is used in place of the placeholder process P2.1 because the input sets do not match. When such an error is detected, generation of the corresponding process will be prevented. This is further illustrated in FIG. 8 in which the process 44B for variation 300B, context C2 will not be generated due to an error registered for input data set D4. Since no error was detected for variation 300A, context C1, process 44A will still be generated.

Figure 9:
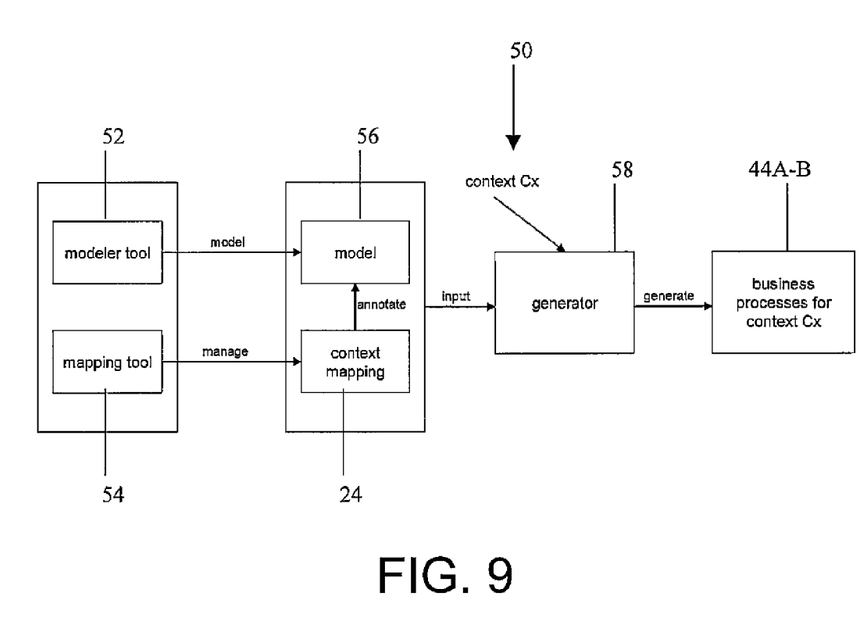
FIG. 9 depicts an architectural diagram according to the present invention.

Referring to FIG. 9, an architectural diagram 50 of the functional blocks of the present invention is shown. Specifically, the system has the following components: a modeler tool 52 for modeling processes that allows the above methodology in specifying placeholder process 22 (FIG. 4) and process variations 30A-B (FIG. 5) for different contexts; a mapping (management) tool 54 for specifying and managing the context-to-process-variation mapping 24 (FIG. 4); a model 56 that captures processes with the notion of placeholder process 22, process variations 30A-B, and context-to-process-variation mapping 24; and a generator 58 that produces processes 40A, 40B (FIG. 6) for a specified context based on the methodology described above for substituting placeholder processes 22 with the appropriate process variations 30A-B to yield processes 40A, 40B. Generator 58 can also perform integrity checks and error detection as part of the process generation function of the present invention. It should be understood that the configuration of components shown in FIG. 9 and FIG. 10 below are intended to be illustrative and that the functionality of the present invention could be implemented with a different configuration.

Among other advantages, this invention avoids the necessity of duplicating the processes up a process tree as described; it avoids the management and maintenance issues as described above; it presents a much better user experience than the previous approaches where business users in one context would see process variations of all contexts; the generated business processes for a context are now syntactically correct and potentially can run through simulation; the generated business processes for a context would allow the potential of generating to process flow runtime (e.g. BPEL) for execution and UML artifacts for implementation; the ability to generate business processes for a new context is provided by adding context-to-process-variation mapping information to the model; etc.

II. Computerized Implementation

Figure 10:
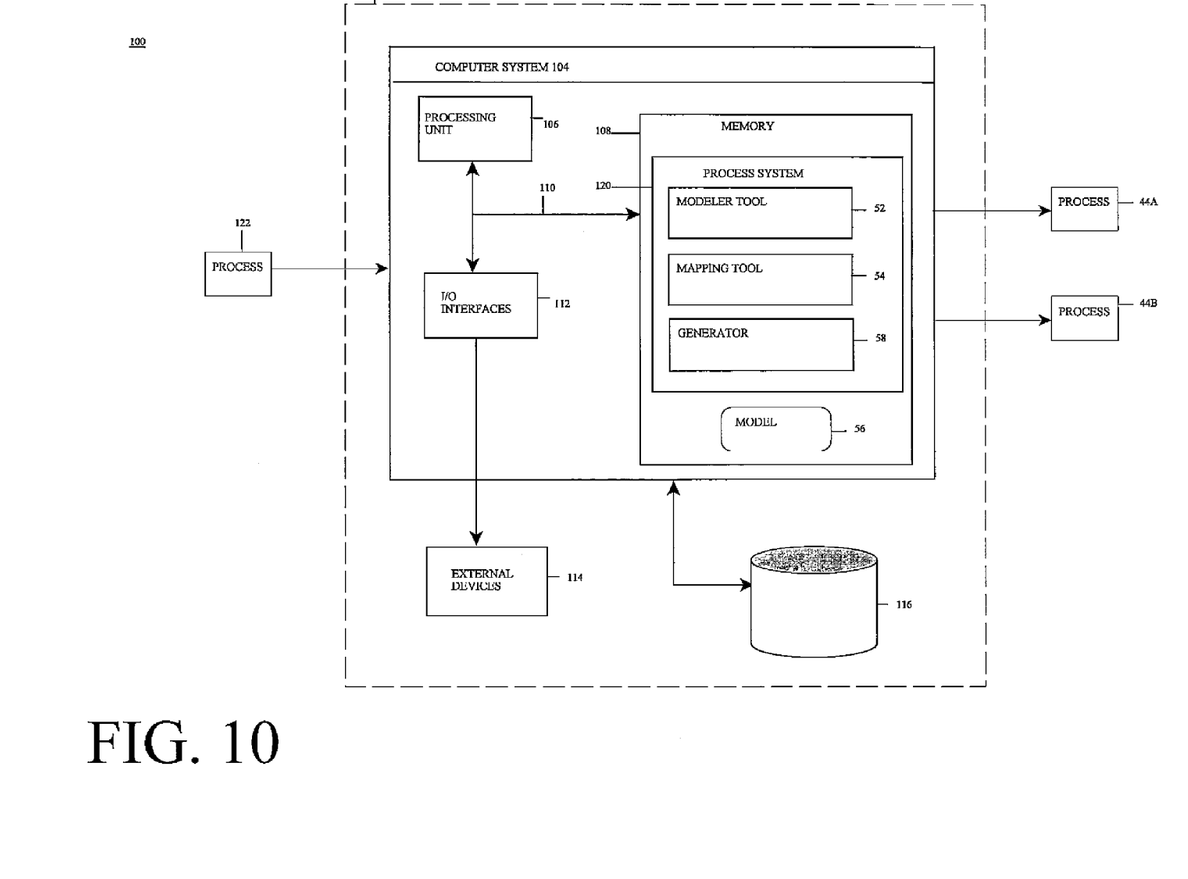
FIG. 10 depicts a more specific computerized implementation according to the present invention.

Referring now to FIG. 10, a more detailed diagram of a computerized implementation 100 of the present invention is shown. As depicted, implementation 100 includes a computer system 104 deployed within a computer implementation 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer implementation 102 is intended to demonstrate that some or all of the components of implementation 100 could be deployed, managed, serviced, etc. by a service provider who offers to implement and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as process system 120, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computerized implementation 102 is only illustrative of various types of computer infrastructures for implementing the invention. For example, in one embodiment, computer implementation 102 comprises two or more computing devices (e.g., a server cluster) that communicate over a network to perform the various process steps of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any system for exchanging information with one or more external interfaces 114. Still further, it is understood that one or more additional components (e.g., system software, math co-processing unit, etc.) not shown in FIG. 10 can be included in computer system 104. However, if computer system 104 comprises a handheld device or the like, it is understood that one or more external interfaces 114 (e.g., a display) and/or storage system 116 could be contained within computer system 104, not externally as shown.

Storage system 116 can be any type of system (e.g., a database) capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is process system 120, which includes a modeler tool 52, a mapping tool 54, and a generator 58. These systems perform the functions of the present invention as discussed above. Specifically, modeler tool 52 for is for modeling processes such as process 122 that allow the above methodology in specifying placeholder process 22 (FIG. 4) and process variations 30A-B (FIG. 5) for different contexts; mapping tool 54 is for specifying and managing the context-to-process-variation mapping 24 (FIG. 4); model 56 captures processes such as process 122 with the notion of placeholder process 22, process variations 30A-B, and context-to-process-variation mapping 24; and generator 58 is for producing processes 40A, 40B for a specified context based on the methodology described above for substituting placeholder processes 22 with the appropriate process variations 30A-B to yield processes 40A, 40B. Generator 58 can also perform integrity checks and error detection as part of the process generation function of the present invention.

While shown and described herein as a method and system for modeling processes, it is understood that the invention further provides various alternative embodiments. For example, in one embodiment, the invention provides a computer-readable/useable medium that includes computer program code that implements an embodiment of the invention. It is understood that the terms computer-readable medium or computer useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), and/or on one or more data storage portions of a computing device, such as memory 108 (FIG. 10) and/or storage system 116 (FIG. 10) (e.g., a fixed disk, a read-only memory, a random access memory, a cache memory, etc).

In another embodiment, the invention provides a business method that performs the processing of the invention on a subscription, advertising, and/or fee basis. That is, a service provider, such as a Solution Integrator, could offer to model processes. In this case, the service provider can create, maintain, support, etc., a computer infrastructure, such as computer implementation 102 (FIG. 10) that performs an embodiment of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for modeling processes. In this case, a computer infrastructure, such as computer implementation 102 (FIG. 10), can be provided and one or more systems for performing an embodiment of the invention can be obtained (e.g., created, purchased, used, modified, etc.) and deployed to the computer infrastructure. To this extent, the deployment of a system can comprise one or more of (1) installing program code on a computing device, such as computer system 104 (FIG. 10), from a computer-readable medium; (2) adding one or more computing devices to the computer infrastructure; and (3) incorporating and/or modifying one or more existing systems of the computer infrastructure to enable the computer infrastructure to perform an embodiment of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for modeling processes using a computer system, comprising:
    modeling a process having multiple variations as a placeholder process;
    associating an annotation with the placeholder process, the annotation mapping the multiple variations to different contexts of the placeholder process; and
    generating at least two process variations for the modeled process using the placeholder process, each generated process variation based on a different one of the different contexts of the placeholder process and providing a distinct input set and/or a distinct output set for the different one of the different contexts of the placeholder process.

2. The method of claim 1, further comprising performing integrity checks to determine if any of the process variations has an error.

3. The method of claim 2, further comprising preventing the generation of any process variation determined to have an error.

4. The method of claim 1, wherein the process is a business process, and wherein at least one of the multiple variations corresponds to a business to business process and at least one of the multiple variations corresponds to a business to consumer process.

5. A system for modeling processes using a computer system, comprising:
    a modeler tool for modeling a process having multiple variations as a placeholder process;
    a mapping tool for associating an annotation with the placeholder process, the annotation mapping the multiple variations to different contexts of the placeholder process;
    a generator for generating at least two process variations for the modeled process using the placeholder process, each generated process variation based on a different one of the different contexts of the placeholder process and providing a distinct input set and/or a distinct output set for the different one of the different contexts of the placeholder process.

6. The system of claim 5, wherein the system performs integrity checks to determine if any of the process variations has an error.

7. The system of claim 6, wherein the system prevents the generation of any process variation determined to have an error.

8. The system of claim 5, wherein the process is a business process, and wherein at least one of the multiple variations corresponds to a business to process and at least one of the multiple variations corresponds to a business to consumer process.

9. A program product stored on a computer readable storage medium for modeling processes using a computer system, the program product comprising program code for causing the computer system to perform:
    modeling a process having multiple variations as a placeholder process;
    associating an annotation with the placeholder process, the annotation mapping the multiple variations to different contexts of the placeholder process; and
    generating at least two process variations for the modeled process using the placeholder process, each generated process variation based on a different one of the different contexts of the placeholder process and providing a distinct input set and/or a distinct output set for the different one of the different contexts of the placeholder process.

10. The program product of claim 9, further comprising program code for causing the computer system to perform:
    performing integrity checks to determine if any of the process variations has an error.

11. The program product of claim 10, further comprising program code for causing the computer system to perform:
    preventing the generation of any processing variation determined to have an error.

12. The program product of claim 9, wherein the process comprises a business process, and wherein at least one of the multiple variations corresponds to a business to business process and at least one of the multiple variations corresponds to a business to consumer process.

13. A method for deploying an application for modeling processes, comprising:
    providing a computer infrastructure being operable to:
        model a process having multiple variations as a placeholder process;
        associate an annotation with the placeholder process, the annotation mapping the multiple variations to different contexts of the placeholder process; and
        generate at least two process variations for the modeled process using the placeholder process, each generated process variation based on a different one of the different contexts of the placeholder process and providing a distinct input set and/or a distinct output set for the different one of the different contexts of the placeholder process.

14. The method of claim 13, wherein the computer infrastructure is further operable to perform integrity checks to determine if any of the process variations has an error.

15. The method of claim 14, wherein the computer infrastructure is further operable to prevent the generation of any process variation determined to have an error.

16. The method of claim 13, wherein the process is a business process, and wherein at least one of the multiple variations corresponds to a business to business process and at least one of the multiple variations corresponds to a business to consumer process.

* * * * *